United States Patent [19]
DeChard

[11] Patent Number: 5,738,139
[45] Date of Patent: Apr. 14, 1998

[54] WASTE WATER RECOVERY SYSTEM

[76] Inventor: Albert DeChard, 502 S. Fremont Ave., Ste. 433, Tampa, Fla. 33607

[21] Appl. No.: 610,426

[22] Filed: Mar. 4, 1996

[51] Int. Cl.⁶ .................. E03B 7/08; F16L 55/07
[52] U.S. Cl. .......... 137/312; 137/561 R; 141/86; 180/69.1; 220/571; 220/573; 222/108; 296/38
[58] Field of Search .................. 137/312, 362, 137/561 A, 561 R, 565; 4/613; 220/571, 573; 222/108, 111; 141/86; 180/69.1; 184/1.5, 106; 296/38

[56] References Cited

U.S. PATENT DOCUMENTS

| | | | |
|---|---|---|---|
| 3,032,062 | 5/1962 | Blahnik | 137/362 |
| 3,304,950 | 2/1967 | Hubert | 137/312 |
| 4,537,217 | 8/1985 | Allen, Jr. | 137/561 A |
| 4,552,166 | 11/1985 | Chadbourne, Sr. et al. | 137/312 |
| 4,679,590 | 7/1987 | Hergenroeder | 137/312 |
| 4,684,562 | 8/1987 | Hartkemeyer | 296/38 |
| 4,729,404 | 3/1988 | Hergenroeder | 137/312 |
| 4,875,537 | 10/1989 | Garnatz et al. | 180/69.1 |
| 5,020,638 | 6/1991 | Smith | 184/106 |
| 5,128,189 | 7/1992 | Bartlett | 184/106 |
| 5,199,457 | 4/1993 | Miller | 137/312 |
| 5,419,945 | 5/1995 | Lopez | 296/38 |
| 5,478,625 | 12/1995 | Wright | 184/106 |
| 5,492,158 | 2/1996 | Haag | 137/312 |

*Primary Examiner*—George L. Walton
*Attorney, Agent, or Firm*—Larson 'Larson, P.A.; Herbert W. Larson

[57] ABSTRACT

A waste water recovery system includes a ground cover made of non-woven geotextiles covered with a fluid impervious barrier layer. A drainage waffle is placed on top of the barrier layer and is covered by a non-skid work surface having a plurality of holes permitting flow of fluid through them. At least the barrier layer and the ground cover are coupled to a surrounding frame through the use of a continuous clip. A pumping system is provided to pump waste liquids from the device to a holding tank.

17 Claims, 6 Drawing Sheets

WASTE WATER RECOVERY SYSTEM

BACKGROUND OF THE INVENTION

The present invention relates to a waste water recovery system.

When vehicles are cleaned or refinished, including, for example, airplanes, automobiles, trucks, boats and motorcycles, customarily, they are cleaned in a driveway or other ground surface. In most instances, when such a vehicle is cleaned or refinished, liquid that is used in the cleaning and refinishing runs and drips off the vehicle and onto the ground surface, draining, eventually, into an adjacent sewer system or body of water. Usually, the liquid that is used for cleaning or refinishing a vehicle includes materials that are hazardous to the environment. Such materials may include phosphates, solvents and other environmentally hazardous materials. Accordingly, a need has developed for a system that may be employed when cleaning or refinishing of a vehicle or other object or device which permits unrestricted cleaning or refinishing of same while capturing waste water and waste liquids to prevent them from being introduced into the environment. It is with this need in mind that the present invention was developed.

The following prior art is known to Applicant:

U.S. Pat. No. 4,684,562 to Hartkemeyer discloses a mat for absorbing oil and other liquids including three layers bonded together by a sealing ring, tape, or adhesive. The three layers absorbent material covered by an absorbent permeable material. The present invention differs from the teachings of Hartkemeyer as contemplating a top layer having a non-skid work surface and having a plurality of openings therethrough permitting fluid to drain therethrough. Additionally, the present invention contemplates a pumping system for pumping liquids from the inventive mat.

U.S. Pat. No. 4,875,537 to Garnatz et al. discloses a disposable oil absorbent drip pad assembly for a vehicle including a bottom layer of a metallic screen material, an intermediate layer of insulating material and a top layer of oil absorbent material with a peripheral binder to secure and interconnect the layers throughout their peripheries. The Garnatz et al. device is designed to be suspended from the underside of a vehicle. The present invention differs from the teachings of Garnatz et al. as contemplating a system designed to be placed on a ground surface rather than mounted on a vehicle. Furthermore, the present invention contemplates a pumping system for pumping liquids from the mat to a holding tank.

U.S. Pat. No. 5,020,638 to Smith discloses a vehicle liquid drip catching system having a rigid tray base containing a removable absorbent pad. The present invention differs from the teachings of Smith as contemplating a waste water recovery system including a non-woven geotextile ground cover covered by a fluid impervious barrier layer covered by a drainage waffle and covered by a non-skid work surface having holes therein to allow water to drain therethrough. The present invention further contemplates the use of a pumping system to pump liquids contained within the mat to a holding tank.

U.S. Pat. No. 5,128,189 to Bartlett discloses a disposable mat having a top absorbent layer and a bottom non-absorbent liquid impervious layer made of a material such as polyethylene. Around the periphery of the Bartlett device is a compressible ridge made of open cell foam material which acts as a containment wall or dam for any non-absorbed liquid. The present invention differs from the teachings of Bartlett as contemplating a non-woven geotextile ground cover as well as a non-skid work surface covering along with the use of a pumping system to pump liquids from the mat to a holding tank.

U.S. Pat. No. 5,419,945 to Lopez discloses a combined simulated creeper for a mechanic and a mat for catching vehicle drippings including a sheet of cellular material with a lower surface in contact with the floor and with a parallel upper surface. While Lopez does include a drip collection impervious layer, Lopez fails to contemplate a non-skid work surface with holes therein nor does Lopez contemplate the use of a pumping system to pump liquids to a holding tank.

U.S. Pat. No. 5,478,625 to Wright discloses a vehicle drip mat including a block of elastomeric material in a rectangular configuration with side walls attached to the central block to retain liquids therein. Wright fails to contemplate the various layers of the present invention.

SUMMARY OF THE INVENTION

The present invention relates to a waste water recovery system including the following interrelated objects, aspects and features:

(1) The preferred embodiment thereof comprises a large mat having a generally rectangular configuration including a series of layers. In the preferred embodiment, the lowest layer consists of a ground cover and pan/mat protection layer made up of a non-woven geotextile material such as one made up of 100% polypropylene, needle punched and described as HEATSET STAPLE FILAMENT Multi-Purpose Fabric manufactured by Carthage Mills. Such material is placed directly on the ground surface.

(2) Above the first layer, a fluid impervious barrier layer is provided which may, if desired, be made of 40 mil polypropylene plastic.

(3) Above the fluid impervious barrier layer, a drainage waffle is placed consisting of, in the preferred embodiment, a three-dimensional high impact polystyrene core with a peripheral flange and having a pattern of raised areas defining recesses therebetween resembling a waffle.

(4) A non-skid work surface is placed over the drainage waffle and, in the preferred embodiment, is made of high molecular weight resin and includes a multiplicity of holes therethrough allowing liquid to be drained therethrough and into the waffle.

(5) The present invention also includes a peripheral frame structure preferably having an L-shaped cross-section with a horizontal leg fixedly mountable on the ground surface through the use of fastening means and with an upstanding leg being employed to receive a clamp designed to clamp at least the ground cover and fluid impervious barrier layers together to ensure that fluid will not leak from the inventive system.

(6) A pumping system is provided including an intake contained within the drainage waffle and a pump designed to pump liquids from the drainage waffle to a holding tank. In this way, liquids accumulating within the drainage waffle may be pumped to the holding tank to prevent contamination of the environment.

As such, it is a first object of the present invention to provide a waste water recovery system.

It is a further object of the present invention to provide such a system including a ground cover covered by a fluid impervious barrier layer.

It is a yet further object of the present invention to provide such a system including a drainage waffle covered by a non-skid work surface having openings therethrough to allow fluid to flow therethrough and into the drainage waffle.

It is a yet further object of the present invention to provide such a system including a pumping system permitting the pumping of liquids from the drainage waffle and into a holding tank to prevent contamination of the environment.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
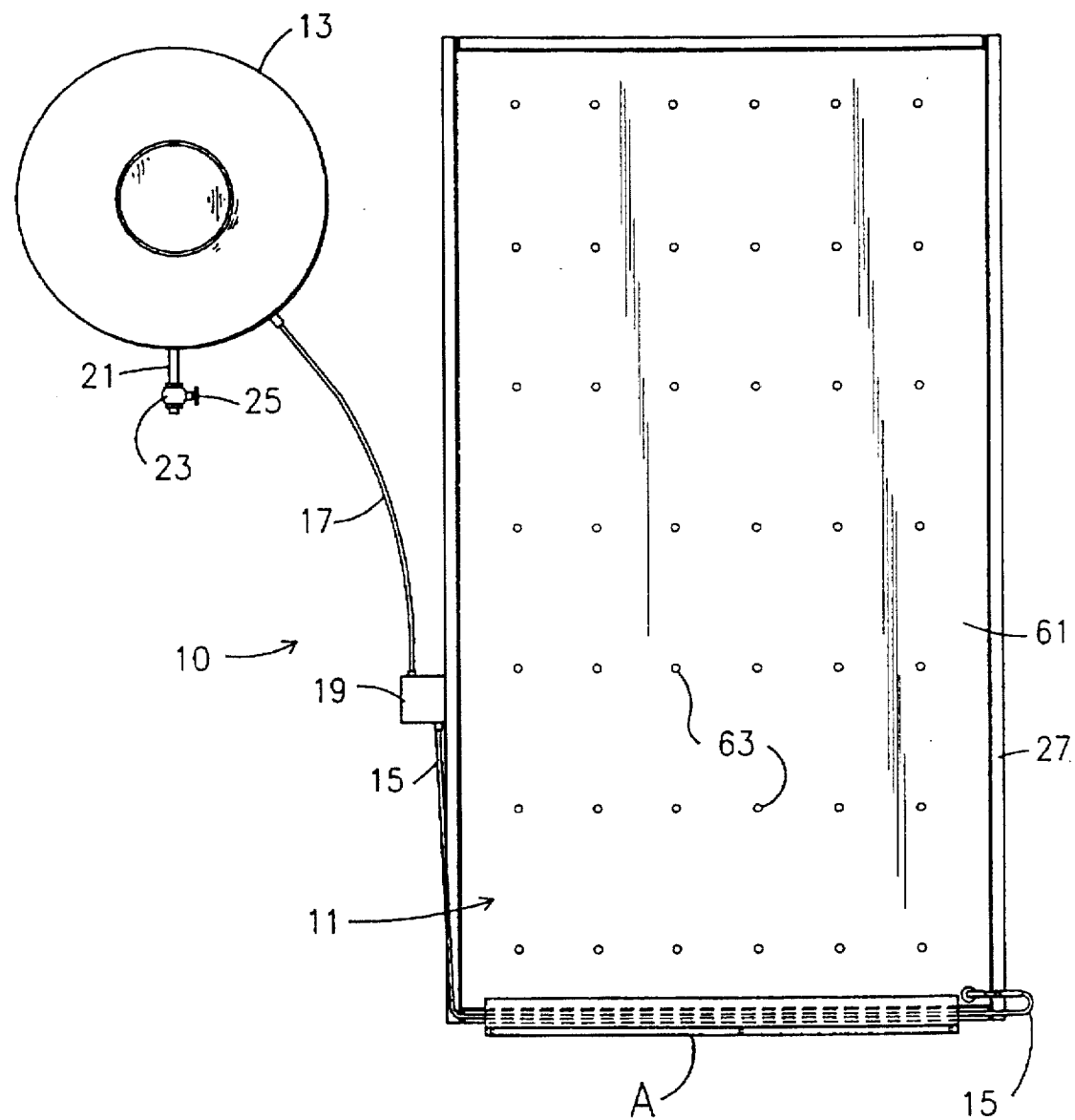
FIG. 1 shows a top view of the inventive system.
Figure 2:
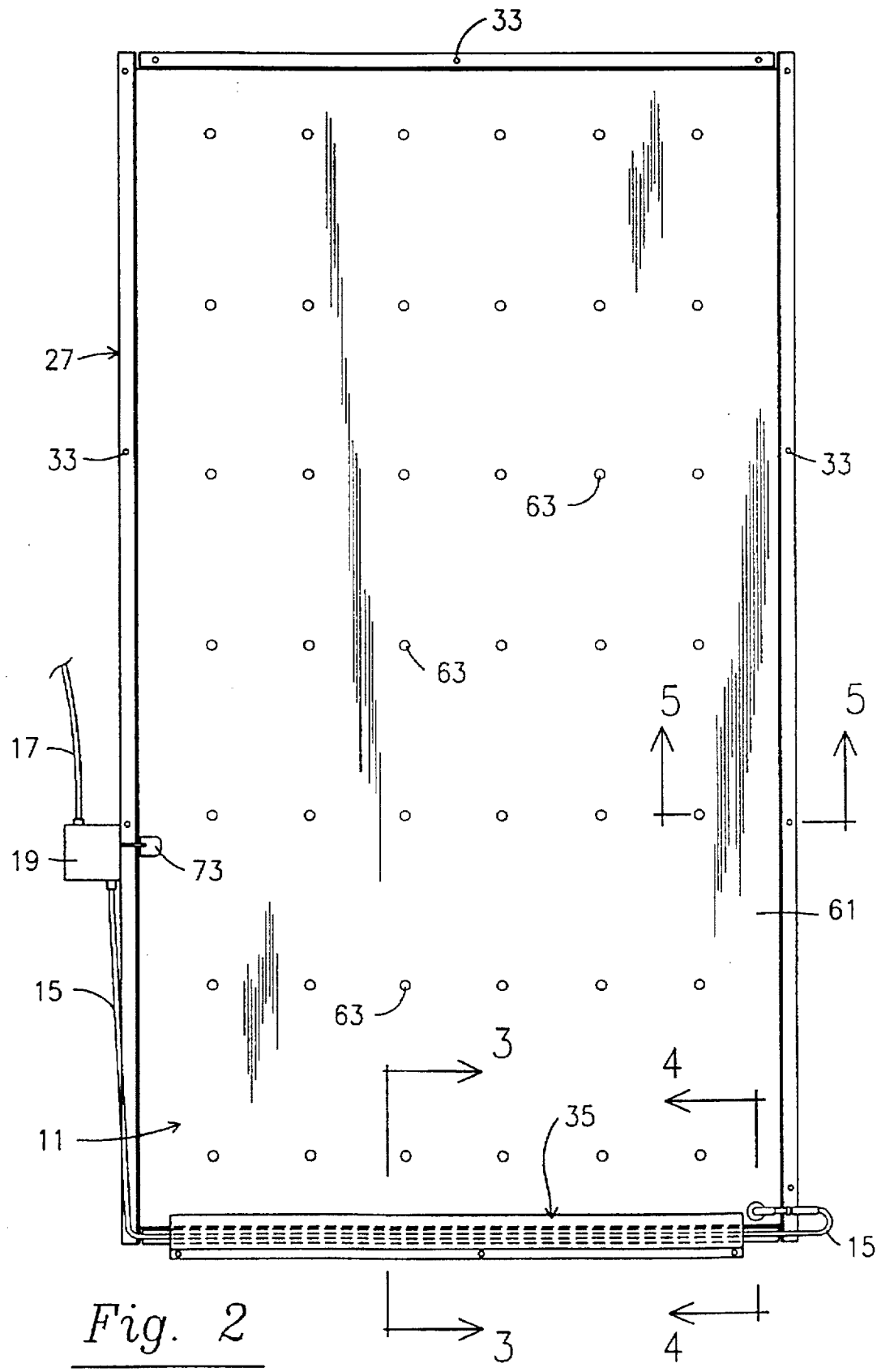
FIG. 2 shows an enlarged top view of the mat portion of the present invention.

With reference, first, to FIGS. 1 and 2, the present invention is generally designated by the reference numeral 10 and is seen to include a mat 11, a holding tank 13, and conduits 15 and 17 connecting the mat 11 with the holding tank 13. A pump 19 is schematically shown and may be of any desired type, and, when activated, pumps liquid from the mat 11 to the holding tank 13. The holding tank 13 includes an outlet pipe 21 having a valve 23 with an actuator 25 which when actuated allows draining of fluids from the holding tank 13 to be taken to a point of safe disposal.

Figure 3:
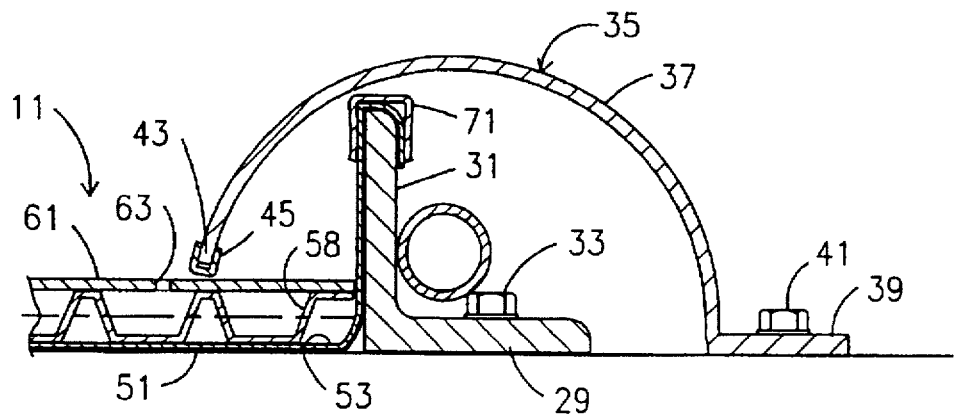
FIG. 3 shows a cross-sectional view along the line 3—3 of FIG. 2.
Figure 4:
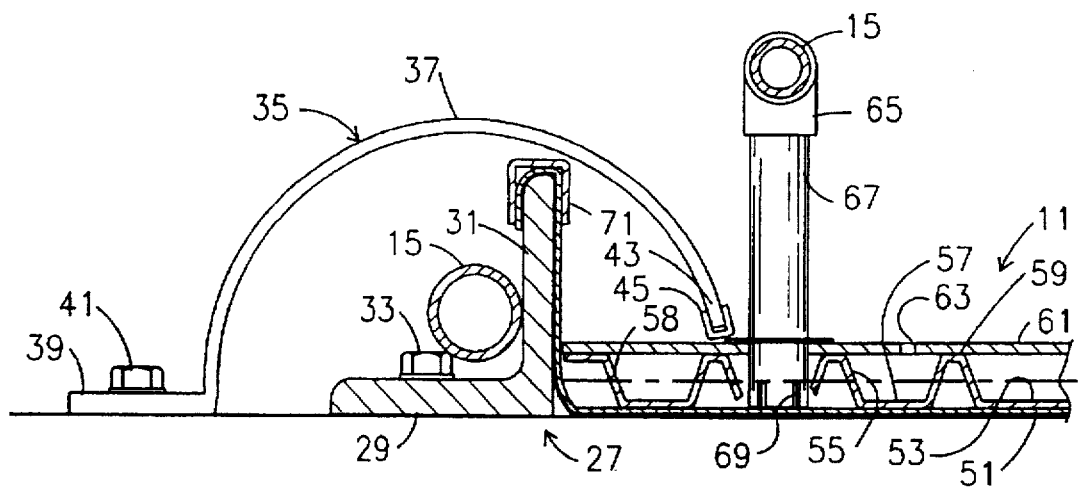
FIG. 4 shows a cross-sectional view along the line 4—4 of FIG. 2.
Figure 5:
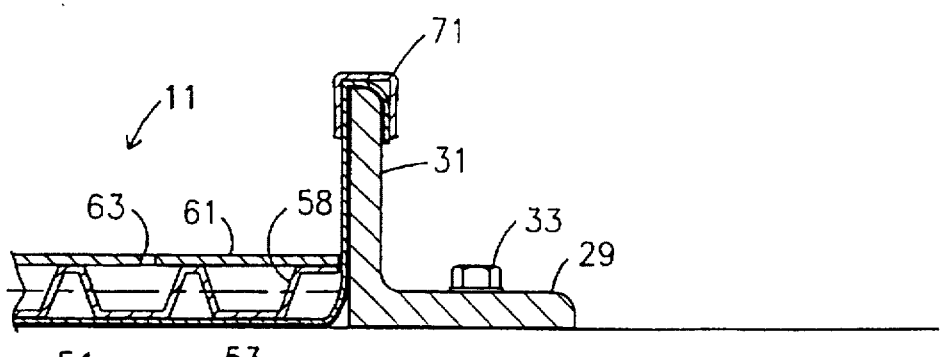
FIG. 5 shows a cross-sectional view along the line 5—5 of FIG. 2.

The mat 11 includes a generally rectangular peripheral frame 27 which, as best seen in FIGS. 3, 4 and 5, is of L-shaped cross-section including a horizontal leg 29 and a vertical leg 31. With reference to FIGS. 1–4, the frame 27 may be fixedly attached to the ground surface through the use of a plurality of bolts 33. As best shown in FIGS. 3 and 4, the portion of the conduit 15 that extends along the edge of the mat 11 is covered by a housing 35 having an arched roof-like structure 37 as well as a bracket 39 having a plurality of bolts 41 extending therethrough to fasten the housing to the ground surface. At an end 43 of the roof-like structure 37, a resilient fitting 45 is provided for a purpose to be described in greater detail hereinafter.

Figure 6:
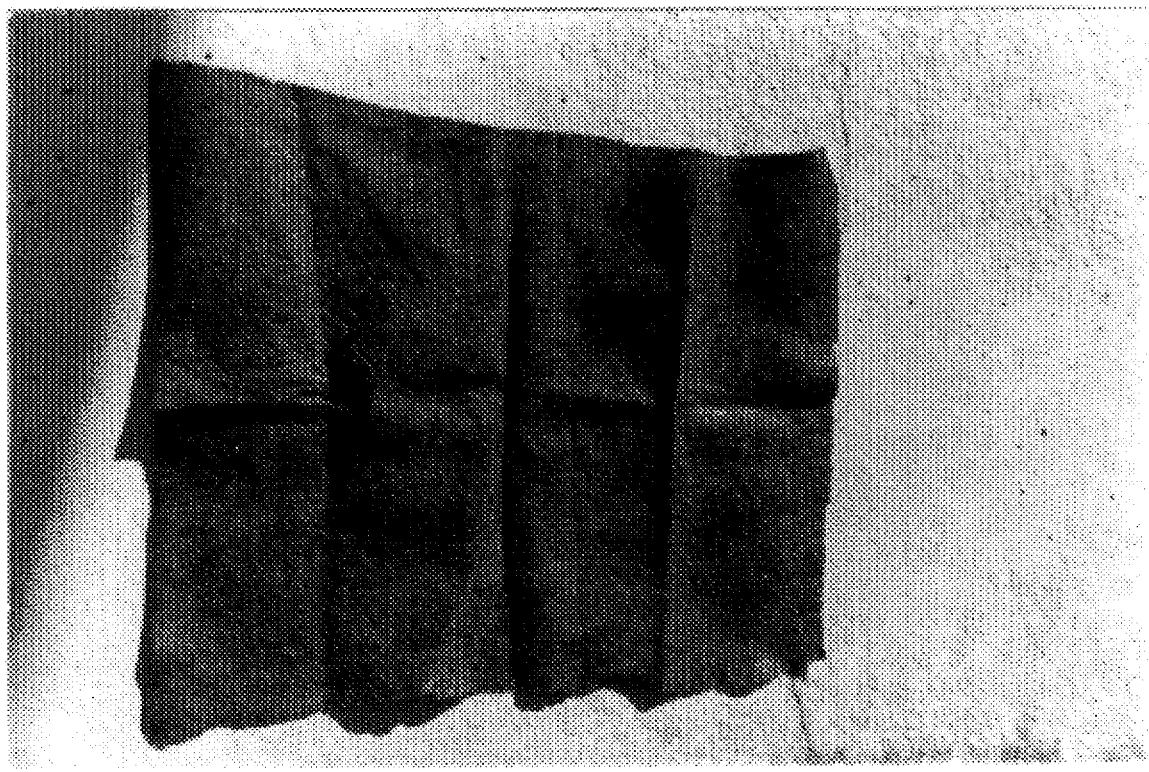
FIG. 6 shows a photograph depicting a top view of the lowermost layer of the inventive mat.

With particular reference to FIGS. 3–5 and 8, the mat 11 preferably includes four layers. A first layer 51 sits directly on the ground surface and comprises a ground cover and pan/mat protection device. In the preferred embodiment of the present invention, the ground cover 51 is made of non-woven geotextile material such as, for example, a 100% polypropylene plastic needle punched and HEATSET STAPLE FILAMENT Multi-Purpose Fabric manufactured by Carthage Mills. The surface texture of the ground cover 51 may be seen with reference to FIG. 6. Above the ground cover 51, a fluid impervious barrier layer 53 is provided. In the preferred embodiment of the present invention, the fluid impervious barrier layer 53 consists of a sheet of thin plastic such as, for example, 40 mil polypropylene geomembrane plastic.

Figure 7:
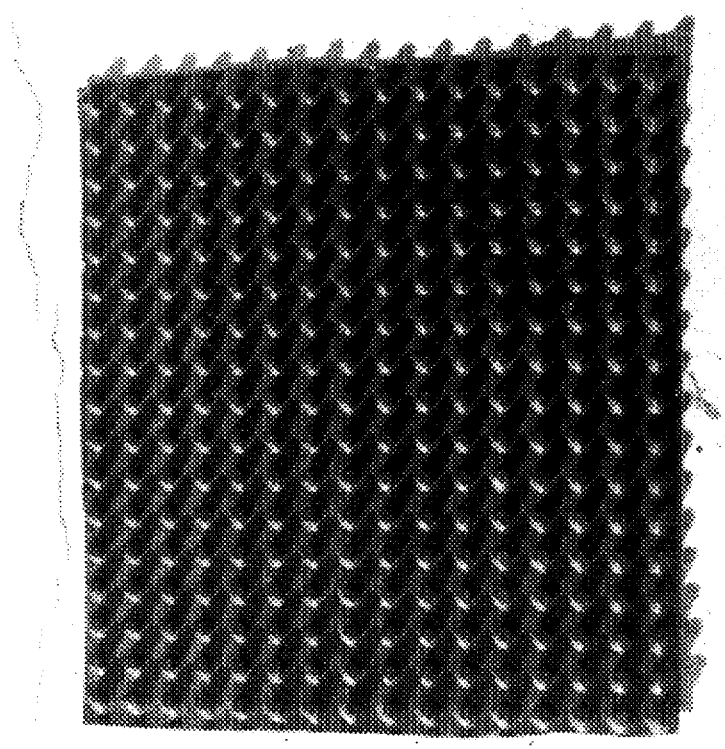
FIG. 7 shows a photograph depicting a top view of the drainage waffle layer.
Figure 8:
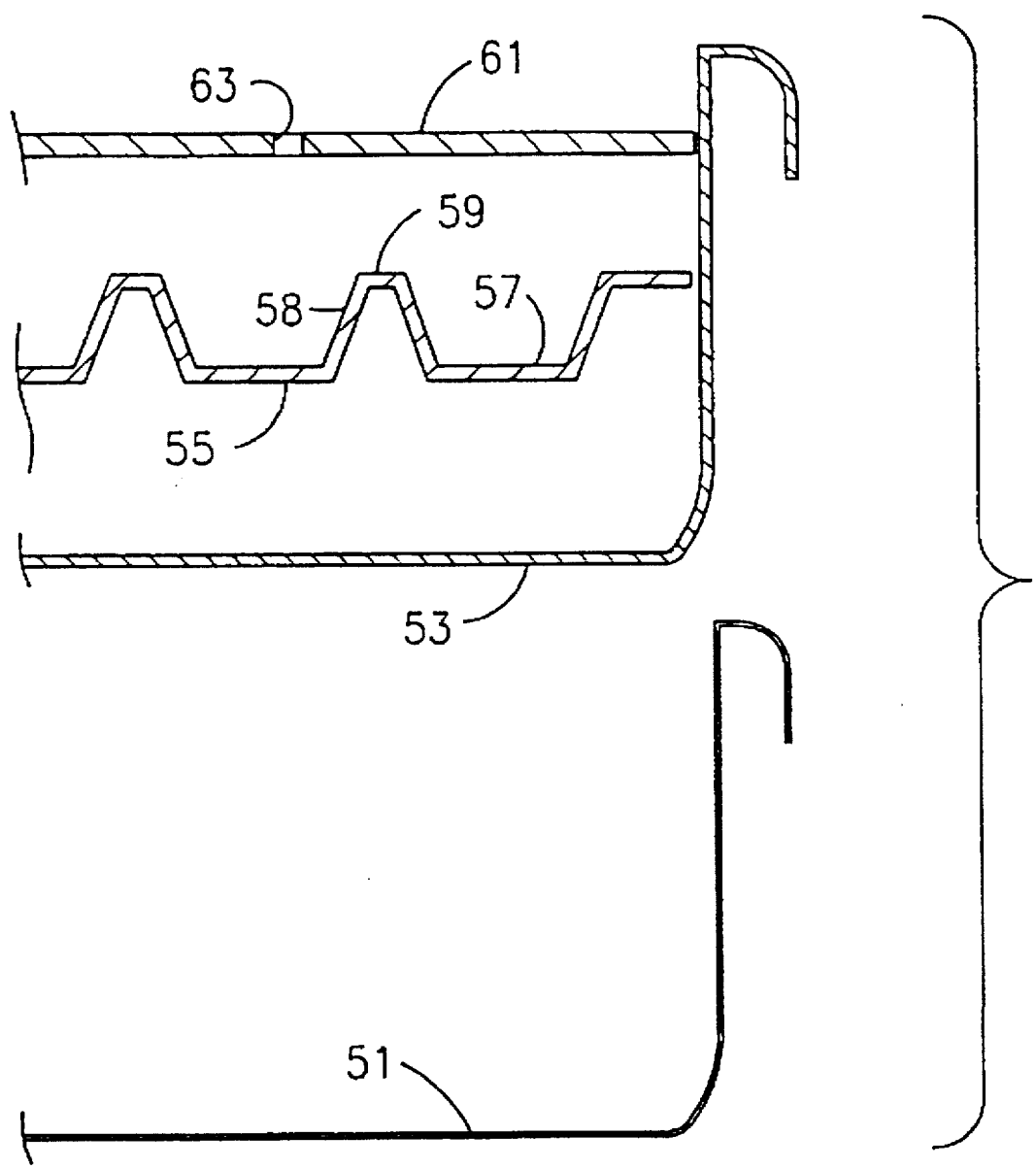
FIG. 8 shows an exploded cross-sectional view depicting all of the layer of the inventive mat.

Above the barrier layer 53, a fluid capturing tray comprising a drainage waffle 55 is provided which, in cross-section, is seen to include a series of recesses 57 and protrusions 59 within a peripheral wall 58. This aspect of the drainage waffle 55 may also be clearly seen with reference to FIG. 7. The drainage waffle 55 is intended to be used to collect all liquids draining into the mat 11. If, instead of the drainage waffle, a receiver with a flat surface were to be employed, a given volume of liquid would define a liquid level much lower than is the case with the drainage waffle with respect to the bottoms of the recesses 57. Thus, use of the drainage waffle 55 best facilitates pumping of liquid therefrom since a relatively lower volume of liquid results in a relatively higher level of fluid within the recesses 57.

Above the drainage waffle 55, a non-skid work surface layer 61 is provided that includes a multiplicity of orifices 63 therethrough. The non-skid work surface layer 61, in the preferred embodiment, is preferably made of virgin, first quality, high molecular weight resin such as those made for containment in hydraulic structures. Such a material is manufactured by the National Seal Company. The non-skid work surface layer receives waste liquid which seeps through the orifices 63 and then into the drainage waffle 55.

With particular reference to FIG. 4, it is seen that the conduit 15 terminates in an L-shaped fitting 65 that connects with a vertical standpipe 67 having a plurality of slots 69 at the lower end thereof located within one of the recesses 57 of the drainage waffle 55. Liquid entering the slots 69 of the standpipe 67 may be pumped through the conduit 15 by the pump 19 to convey the liquid through the conduit 17 to the holding tank 13.

As best seen in FIGS. 3 and 4, the resilient fitting 45 of the roof-like structure 37 sits on top of the non-skid work surface 61 and aids in retaining the non-skid work surface 61 in overlying relation to the drainage waffle 55.

In a further aspect, as best seen with reference to FIGS. 3–5, a clip 71 is mounted in overlying relation to the upstanding leg 31 of the bracket 27. As shown, captured underneath the clip 71 are the peripheral edges of the ground cover 51 and the liquid impervious barrier layer 53. These layers are folded over the leg 31 of the bracket 27 whereupon the clip 71 is forced thereover to mount the layers 51 and 53 to the leg 31. As should be understood from FIGS. 3–5, in particular, the upstanding nature of the leg 31 creates an enclosure enclosing any environmentally hazardous liquids therewithin to prevent contamination of the environment.

In use, a vehicle may be driven in overlying relation to the mat 11 whereupon the vehicle may be cleaned or refinished with all liquids employed during the process falling onto the non-skid work surface 61, draining through the orifices 63 and filling the drainage waffle 55 whereupon, by activation of the pump 19, the liquids may be pumped to the holding tank 13.

If desired, a liquid level sensor 73 can be employed to sense the level of liquid within the drainage waffle 55 and, responsive to liquid rising to a pre-set level, to activate the pump 19 to pump the liquid from the drainage waffle 55 until the liquid level is reduced to some lower level. If desired, operation of the pump 19 could easily be controlled via a timer as well.

As such, an invention has been disclosed in terms of a preferred embodiment thereof which fulfills each and every one of the objects of the invention as set forth hereinabove and describes a new and useful waste water recovery system of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

I claim:

1. a) a frame adapted to be placed upon a ground surface and having an upstanding wall, said frame enclosing a space on a ground surface;
   b) a fluid impervious barrier layer clamped to said wall and covering said space;
   c) a fluid capturing tray mounted above and along said barrier layer and extending to said wall;
   d) a work surface layer mounted over and supported by said tray and extending to said wall, said work surface layer having a plurality of openings therethrough communicating with the tray allowing fluid to pass therethrough to be collected in at least a portion of said tray;
   e) a means extending through said work surface layer and into said at least a portion of said tray for removing fluid; and
   f) a means to pump fluid from said at least a portion of the fluid capturing tray to an outlet.

2. The system of claim 1, wherein said frame has an L-shaped cross-section including a horizontal wall connected to said upstanding wall, said horizontal wall including fastening means for fastening said frame to a ground surface.

3. The system of claim 2, wherein said frame is generally rectangular.

4. The system of claim 1, wherein said fluid capturing tray comprises a drainage waffle having a peripheral wall and a plurality of upstanding protrusions within said peripheral wall.

5. The system of claim 1, wherein said work surface layer includes an upper non-skid surface.

6. The system of claim 1, further including a ground cover underlying said barrier layer.

7. The system of claim 6, wherein said ground cover has a periphery secured to said upstanding wall of said frame.

8. The system of claim 1, wherein the means to pump fluid is a pump having an inlet within said tray and the outlet is connected to a holding tank.

9. The system of claim 8 wherein said pump is mounted on said frame and mumps liquid from a recess in said tray.

10. The system of claim 8, wherein said inlet is fluidly connected to said tray via a conduit.

11. The system of claim 10, further including a housing connected to said frame and overlying a portion of said conduit.

12. A waste water recovery system, comprising:
   a) a frame adapted to be placed upon a ground surface and having an upstanding wall, said frame enclosing a space on a ground surface;
   b) a ground cover overlying a ground surface and fastened to said frame;
   c) a fluid impervious barrier layer covering said ground cover and fastened to said free;
   d) a drainage waffle overlying and along said barrier layer and including a peripheral wall and a plurality of protrusions within said peripheral wall defining recesses therebetween;
   e) a work surface overlying and supported by said drainage waffle and having an upper non-skid surface and a plurality of openings therethrough communicating with the drainage waffle and allowing fluid to pass therethrough to be collected within said recesses in said drainage waffle; and
   f) a pumping system including an input extending through the work surface fluidly connected within said drainage waffle to said recesses and an output connecting to a holding tank.

13. The system of claim 12, wherein said ground cover is made of a non-woven geotextile material.

14. The system of claim 12, wherein said barrier layer is made of polypropylene.

15. The system of claim 12, wherein said work surface layer is made of a high molecular weight resin.

16. The system of claim 12, said pumping system including a pump fastened to said frame.

17. The system of claim 12, wherein said drainage waffle is made of polystyrene.

* * * * *